United States Patent
Rodgers et al.

(10) Patent No.: US 9,908,079 B2
(45) Date of Patent: Mar. 6, 2018

(54) SEPARATION OF HYDROCARBONS USING REGENERABLE MACROPOROUS ALKYLENE-BRIDGED ADSORBENT

(71) Applicant: Dow Global Technologies LLC, Midland, MI (US)

(72) Inventors: Matthew L. Rodgers, Midland, MI (US); Brandon J. Kern, Midland, MI (US); Scott T. Matteucci, Midland, MI (US); H. Robert Goltz, Midland, MI (US); Daryl J. Gisch, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/536,329

(22) PCT Filed: Jan. 6, 2016

(86) PCT No.: PCT/US2016/012259
§ 371 (c)(1),
(2) Date: Jun. 15, 2017

(87) PCT Pub. No.: WO2016/122843
PCT Pub. Date: Aug. 4, 2016

(65) Prior Publication Data
US 2017/0368494 A1  Dec. 28, 2017

Related U.S. Application Data

(60) Provisional application No. 62/108,110, filed on Jan. 27, 2015.

(51) Int. Cl.
*B01D 53/02* (2006.01)
*B01D 53/08* (2006.01)
(Continued)

(52) U.S. Cl.
CPC ............ *B01D 53/08* (2013.01); *B01J 20/267* (2013.01); *C10L 3/101* (2013.01);
(Continued)

(58) Field of Classification Search
CPC .......... B01D 2253/202; B01D 2256/24; B01D 2257/7022; B01D 2259/40094; B01D 53/08; B01J 20/267; C10L 3/101
See application file for complete search history.

(56) References Cited

U.S. PATENT DOCUMENTS 1,875,199 A    8/1932 Parkman
2,493,911 A    1/1950 Brandt
(Continued)

FOREIGN PATENT DOCUMENTS

EP        481603       4/1992
GB       1525420       9/1978
(Continued)

OTHER PUBLICATIONS

Cavenati et al., Methane Purification by PSA from Natural Gas Sources, 2nd Mercosure Congress on Chemical Engineering.
(Continued)

*Primary Examiner* — Christopher P Jones
(74) *Attorney, Agent, or Firm* — Edward W. Black

(57) ABSTRACT

A method for separating natural gas liquids (NGLs) from a hydrocarbon gas mixture containing natural gas liquids and methane, comprising the steps of: i) providing a bed of adsorbent selective for NGLs over methane; ii) passing a hydrocarbon gas mixture containing methane and NGL through the bed of adsorbent to at least partially remove NGLs from the gas mixture to produce: (a) NGL-loaded adsorbent and (b) NGL-depleted hydrocarbon gas mixture; iii) recovering the NGL-depleted hydrocarbon gas mixture; iv) regenerating the NGL-loaded adsorbent by at least
(Continued)

partially removing NGLs from the adsorbent; and v) sequentially repeating steps (ii) and (iii) using regenerated adsorbent from step (iv).

9 Claims, 3 Drawing Sheets

(51) Int. Cl.
  *B01J 20/26* (2006.01)
  *C10L 3/10* (2006.01)
(52) U.S. Cl.
  CPC .... *B01D 2253/202* (2013.01); *B01D 2256/24* (2013.01); *B01D 2257/7022* (2013.01); *B01D 2259/40094* (2013.01)

(56) References Cited

U.S. PATENT DOCUMENTS

| | | | |
|---|---|---|---|
| 2,495,842 A | 1/1950 | Gilliland | |
| 2,495,845 A | 1/1950 | Jefferson et al. | |
| 2,500,149 A | 3/1950 | Boyer | |
| 2,527,964 A | 10/1950 | Robinson | |
| 2,631,127 A | 3/1953 | D'Aleilo | |
| 2,642,417 A | 6/1953 | Wheaton et al. | |
| 2,664,801 A | 1/1954 | Eisbein | |
| 2,764,564 A | 9/1956 | McMaster | |
| 2,960,480 A | 11/1960 | Thielen | |
| 2,992,544 A | 7/1961 | McMaster | |
| 3,037,052 A | 5/1962 | Bortnick | |
| 3,065,790 A | 11/1962 | Holm | |
| 3,116,130 A | 12/1963 | Miller | |
| 3,150,716 A | 9/1964 | Strelzoff et al. | |
| 3,266,007 A | 8/1966 | Sullivan | |
| 3,350,847 A * | 11/1967 | Woertz | C07C 7/11 95/177 |
| 3,458,973 A | 8/1969 | Spencer et al. | |
| 3,554,904 A | 1/1971 | Humphries | |
| 3,660,967 A * | 5/1972 | Collins | B01D 53/02 95/137 |
| 3,729,457 A | 4/1973 | Davankov | |
| 4,000,990 A | 1/1977 | Bingham | |
| 4,040,990 A | 8/1977 | Neely | |
| 4,070,446 A | 1/1978 | Horikiri et al. | |
| 4,191,813 A | 3/1980 | Reed et al. | |
| 4,197,133 A | 4/1980 | Zweifer et al. | |
| 4,224,415 A | 9/1980 | Meitzner et al. | |
| 4,256,840 A | 3/1981 | Meitzner et al. | |
| 4,263,407 A | 4/1981 | Reed, Jr. | |
| 4,297,220 A | 10/1981 | Meitzner et al. | |
| 4,322,394 A | 3/1982 | Mezey et al. | |
| 4,333,529 A | 6/1982 | McCorquodale | |
| 4,334,102 A * | 6/1982 | Decker | C07C 41/38 210/634 |
| 4,344,486 A | 8/1982 | Parrish | |
| 4,382,124 A | 5/1983 | Meitzner et al. | |
| 4,385,133 A | 5/1983 | Alberino et al. | |
| 4,419,245 A | 12/1983 | Barrett et al. | |
| 4,444,961 A | 4/1984 | Timm | |
| 4,522,975 A | 6/1985 | O'Connor et al. | |
| 4,528,000 A | 7/1985 | McGill et al. | |
| 4,564,644 A | 1/1986 | Harris | |
| 4,565,644 A | 1/1986 | Harris | |
| 4,582,859 A | 4/1986 | Lein, Jr. et al. | |
| 4,623,706 A | 11/1986 | Timm et al. | |
| 4,655,807 A | 4/1987 | Ohmori et al. | |
| 4,666,673 A | 5/1987 | Timm | |
| 4,728,346 A * | 3/1988 | Murphy | B01D 69/12 264/177.14 |
| 4,762,543 A | 8/1988 | Pantermuehl et al. | |
| 4,775,655 A | 10/1988 | Edwards et al. | |
| 4,839,331 A | 6/1989 | Maroldo et al. | |
| 4,857,084 A | 8/1989 | Robbins et al. | |
| 4,894,339 A | 1/1990 | Hanazato et al. | |
| 4,950,332 A | 8/1990 | Stringfield et al. | |
| 4,965,083 A | 10/1990 | Norman et al. | |
| 5,021,253 A | 6/1991 | Dawson-Ekeland et al. | |
| 5,059,578 A | 10/1991 | Marumo et al. | |
| 5,079,274 A | 1/1992 | Schneider et al. | |
| 5,104,530 A | 4/1992 | Maroldo et al. | |
| 5,134,169 A | 7/1992 | Green et al. | |
| 5,141,965 A | 8/1992 | Pike | |
| 5,167,899 A | 12/1992 | Jezic | |
| 5,171,333 A | 12/1992 | Maurer | |
| 5,217,505 A | 6/1993 | Maroldo et al. | |
| 5,231,115 A | 7/1993 | Harris | |
| 5,244,926 A | 9/1993 | Harris et al. | |
| 5,248,435 A | 9/1993 | Morita et al. | |
| 5,288,307 A | 2/1994 | Goltz et al. | |
| 5,300,468 A | 4/1994 | Senum et al. | |
| 5,460,725 A | 10/1995 | Stringfield | |
| 5,494,228 A | 2/1996 | Eaton et al. | |
| 5,504,163 A | 4/1996 | Tegen et al. | |
| 5,509,956 A | 4/1996 | Opperman et al. | |
| 5,616,622 A | 4/1997 | Harris et al. | |
| 5,683,600 A | 11/1997 | Kelley et al. | |
| 5,779,768 A | 7/1998 | Anand et al. | |
| 5,840,099 A | 11/1998 | Kratz | |
| 5,855,650 A | 1/1999 | Kalbassi et al. | |
| 5,893,947 A | 4/1999 | Pease et al. | |
| 5,946,816 A | 9/1999 | Smith | |
| 5,972,834 A | 10/1999 | Ohsaki et al. | |
| 5,993,516 A | 11/1999 | Morris et al. | |
| 6,172,167 B1 | 1/2001 | Stapert et al. | |
| 6,423,658 B1 | 7/2002 | Thonnelier et al. | |
| 6,562,110 B2 | 5/2003 | Koros et al. | |
| 6,562,113 B1 | 5/2003 | Aykanian et al. | |
| 6,656,252 B2 | 12/2003 | Kita et al. | |
| 6,726,746 B2 | 4/2004 | Dai et al. | |
| 6,756,462 B2 | 6/2004 | Pafford et al. | |
| 6,924,317 B2 | 8/2005 | Feistel et al. | |
| 7,066,986 B2 | 6/2006 | Haben et al. | |
| 7,247,191 B2 | 4/2007 | Koros et al. | |
| 7,282,153 B2 | 10/2007 | Barrett et al. | |
| 7,297,394 B2 | 11/2007 | Khemani et al. | |
| 7,410,525 B1 | 8/2008 | Liu et al. | |
| 7,476,659 B2 | 1/2009 | Hayashi et al. | |
| 7,815,987 B2 | 10/2010 | Mickols et al. | |
| 7,882,963 B2 | 2/2011 | Mickols et al. | |
| 7,897,797 B2 | 3/2011 | Emrick et al. | |
| 8,002,120 B2 | 8/2011 | Niu et al. | |
| 8,163,814 B2 | 4/2012 | Emrick et al. | |
| 8,268,047 B2 | 9/2012 | Allie | |
| 8,444,750 B2 | 5/2013 | Deckman et al. | |
| 8,529,664 B2 | 9/2013 | Deckman et al. | |
| 8,551,229 B2 | 10/2013 | Hufton et al. | |
| 8,574,348 B2 | 11/2013 | Struyf et al. | |
| 8,734,571 B2 | 5/2014 | Golden et al. | |
| 9,108,145 B2 | 8/2015 | Kalbassi et al. | |
| 9,169,367 B2 | 10/2015 | Matteucci et al. | |
| 9,579,627 B2 | 2/2017 | Liu et al. | |
| 2002/0002267 A1 | 1/2002 | Long | |
| 2002/0036086 A1 | 3/2002 | Minkkinen et al. | |
| 2002/0150522 A1 | 10/2002 | Heim et al. | |
| 2004/0006145 A1 | 1/2004 | Dimotsis et al. | |
| 2004/0256597 A1 | 12/2004 | Barrett et al. | |
| 2005/0211090 A1 | 9/2005 | McCullough | |
| 2006/0191410 A1 | 8/2006 | Dolan et al. | |
| 2008/0143014 A1 | 6/2008 | Tang | |
| 2008/0214743 A1 | 9/2008 | Broos et al. | |
| 2008/0282884 A1 | 11/2008 | Kelley et al. | |
| 2010/0126341 A1 | 5/2010 | Matteucci et al. | |
| 2011/0315012 A1 | 12/2011 | Kuznicki et al. | |
| 2012/0042689 A1 | 2/2012 | Bresler et al. | |
| 2012/0222552 A1 | 9/2012 | Ravikovitch et al. | |
| 2012/0279393 A1 * | 11/2012 | Menzel | B01D 53/1475 95/161 |
| 2013/0192299 A1 | 8/2013 | Dolan et al. | |
| 2013/0220935 A1 | 8/2013 | Isacoff et al. | |
| 2013/0255490 A1 | 10/2013 | Matteucci et al. | |
| 2013/0291723 A1 | 11/2013 | Zhou et al. | |
| 2014/0033920 A1 * | 2/2014 | Tate | B01D 53/02 95/139 |

(56) References Cited

U.S. PATENT DOCUMENTS

| | | | |
|---|---|---|---|
| 2014/0338425 | A1 | 11/2014 | Kalbassi et al. |
| 2016/0122671 | A1 | 5/2016 | Matteucci et al. |
| 2016/0136614 | A1 | 5/2016 | Matteucci et al. |
| 2016/0145517 | A1 | 5/2016 | Matteucci et al. |
| 2016/0175810 | A1* | 6/2016 | Watanabe ............ C07C 7/12 502/402 |
| 2016/0319210 | A1 | 11/2016 | Matteucci et al. |
| 2016/0333275 | A1 | 11/2016 | Matteucci et al. |
| 2016/0340595 | A1 | 11/2016 | Matteucci et al. |
| 2016/0340596 | A1 | 11/2016 | Matteucci et al. |
| 2016/0355743 | A1 | 12/2016 | Matteucci et al. |
| 2017/0066987 | A1 | 3/2017 | Leister et al. |
| 2017/0066988 | A1 | 3/2017 | Leister et al. |

FOREIGN PATENT DOCUMENTS

| | | |
|---|---|---|
| JP | 2005194132 | 7/2005 |
| WO | 2016122843 | 8/2013 |
| WO | 2015130338 | 9/2015 |
| WO | 2015130339 | 9/2015 |
| WO | 2016018437 | 2/2016 |
| WO | 2016069316 | 5/2016 |
| WO | 2016122842 | 8/2016 |

OTHER PUBLICATIONS

Liu, J. et al. "High throughput development of one carbon molecular sieve for many gas separations" Microporous and Mesoporous Materials (2014).

Miura, K. et al., "Control of micropore formation in the carbonized ion exchange resin by utilizing pillar effect" Carbon 37 (1999) 1455-1461.

Miura, K., "Preparation of novel porous carbons supporting metal nanoparticles and their applications to energy and environmental related issues" J. Ind. Eng. Chem., 11, No. 6, (2005) 797-817.

Neely, J. Characterization of Polymer Carbons Derived from Porous Sulfonated Polystyrene, Carbon 19 (1980) 27-36.

Tagliabue, et al., Natural Gas Treating by Selective Adsorption: Material Science and Chemical Engineering Interplay, Chemical Engineering Journal 155 (2009) 553-566.

V.A. Davankov, et al., Reaction Polymers, vol. 13, 27 (1990).

V.A. Davankov et al., "Structure and Adsorbent Properties of Hypercrosslinked Polystyrene Sorbents," Ion Exchange Developments and Applications, ed. JA. Greig (1996).

Volatile Organic Compounds (VOC) Recovery Seminar, 1998. Cincinnati, OH.

* cited by examiner

SEPARATION OF HYDROCARBONS USING REGENERABLE MACROPOROUS ALKYLENE-BRIDGED ADSORBENT

FIELD

The invention relates to the separation of hydrocarbons (e.g. $C_1$ or $C_2$ alkanes from $C_3$ and heavier alkanes) using a regenerable polymeric adsorbent.

INTRODUCTION

Many sources of hydrocarbons such as natural gas include mixtures of paraffins (e.g. methane, ethane, propane, butane, etc.) along with a variety of heavier hydrocarbons and other gases. Economic separation of selected hydrocarbons (e.g. methane, ethane) from such mixtures has become increasingly important with the proliferation of hydraulic fracturing. Many of these new sources of natural gas possess much higher levels of natural gas liquids (NGLs) as compared with traditional sources of natural gas (e.g. BTU values over 1058 as compared with traditional values of near 1028). As a consequence, devices that use such gas as a fuel source, (e.g. gas compressors)operate outside of their design parameters resulting in higher operating temperatures, increased pollution levels and more maintenance. Similar issues exist with hydrocarbon gas co-produced with oil. Storage and transport of such gases has also become a challenge due to the higher BTU content.

A variety of adsorbents have been used in gas separations including: aluminas, hydrotalcites, silicates, silica gels and clinoptilotics (U.S. Pat. No. 5,993,516). Carbonaceous adsorbents, sometimes referred to as "carbon molecular sieves," have also been described for use in the purification of hydrogen and the removal of water, methane, sulfur, carbon dioxide, nitrogen oxides and halocarbons from various fluid mixtures. See for example: U.S. Pat. No. 5,059,578, U.S. Pat. No. 5,217,505, U.S. Pat. No. 5,972,834 and US2013/0220935. See also Cavenati et al., Methane Purification by PSA from Natural Gas Sources, 2nd Mercosure Congress on Chemical Engineering. Carbonaceous adsorbents are carbonized forms of carbon compounds such as coal, coke, peat, wood charcoal, nut shell char, fruit nut char, coconut shell char, bone char, phenol resins, furan resins, and vinylidene chloride copolymers, see for example U.S. Pat. No. 5,300,468 and U.S. Pat. No. 5,972,834. WO2014/160624 describes the use a microporous carbon molecular sieve for separating alkenes from alkanes. The material comprises a non-melting binder and a non-porous gel type sulfonated ion exchange resin that is pyrolized at temperatures from 500 to 1000° C. Similar uses of pyrolized gel type sulfonated ion exchange resins are also discussed in: Liu, J. et al. "High throughput development of one carbon molecular sieve for many gas separations" Microporous and Mesoporous Materials (2014); Miura, K., "Preparation of novel porous carbons supporting metal nanoparticles and their applications to energy and environmental related issues" J. Ind. Eng. Chem., 11, No. 6, (2005) 797-817, and Miura, K., et al. "Control of micropore formation in the carbonized ion exchange resin by utilizing pillar effect," Carbon 37 (1999) 1455-1461. Pyrolyzed sulfonated macroporous ion exchange resins are also described in the literature. See for example: Neely, J. Characterization of Polymer Carbons Derived from Porous Sulfonated Polystyrene, Carbon 19 (1980) 27-36, U.S. Pat. No. 4,040,990 and U.S. Pat. No. 4,839,331. An overview of various adsorbents and their use in gas separations is provided in: Tagliabue, et al., Natural Gas Treating by Selective Adsorption: Material Science and Chemical Engineering Interplay, Chemical Engineering Journal 155 (2009) 553-566.

It would be desirable to have a regenerable polymeric adsorbent and associated method that is capable of removing $C_2+$ paraffins (e.g. propane, butane) or NGLs from natural gas in an economic manner. Ideally, NGLs could be separately recovered. Systems such as batch, semi-batch or continuous operation microwave regenerated adsorption processes are known. Regeneration involves exposing the adsorbent to higher temperature or lower pressure. Applicable techniques for exposing the adsorbent to higher temperatures include heating the bed with electric or gas heaters, passing hot gas through the bed, and irradiating the adsorbent with microwave radiation (see for example U.S. Pat. No. 5,509,956, U.S. Pat. No. 5,946,816 and JP2005/194132). Irradiation with microwaves is a preferred approach. However, one of the limitations of such systems is their need to have shielding included within the desorption chamber as traditional polymeric adsorbents do not completely absorb the microwaves. Furthermore, these lost microwaves are designed to heat the adsorbent and any microwaves passing through the adsorbent constitute wasted energy and reduced productivity of the system.

SUMMARY

In one embodiment the invention includes a method for separating methane or ethane from a hydrocarbon gas mixture comprising methane or ethane, or a combination of methane and ethane, along with $C_2+$ paraffins, wherein the method comprises the steps of:

i) providing a bed of adsorbent selective for $C_2+$ paraffins over methane and ethane;

ii) passing a hydrocarbon gas mixture through the bed of adsorbent to at least partially remove $C_2+$ paraffins from the gas mixture to produce: (a) $C_2+$ paraffins—loaded adsorbent and (b) $C_2+$ paraffins—depleted hydrocarbon gas mixture;

iii) recovering the $C_2+$ paraffins—depleted hydrocarbon gas mixture;

iv) regenerating the $C_2+$ paraffins—loaded adsorbent by at least partially removing $C_2+$ paraffins from the adsorbent; and v) sequentially repeating steps (ii) and (iii) using regenerated adsorbent from step (iv).

In a preferred embodiment, the step of regenerating the NGL-loaded adsorbent includes irradiating the adsorbent with microwaves. In another preferred embodiment, the adsorbent includes a macroporous alkylene-bridged adsorbent which is preferably functionalized (e.g. with an amine or sulfur containing functional group).

DETAILED DESCRIPTION

Figure 1:
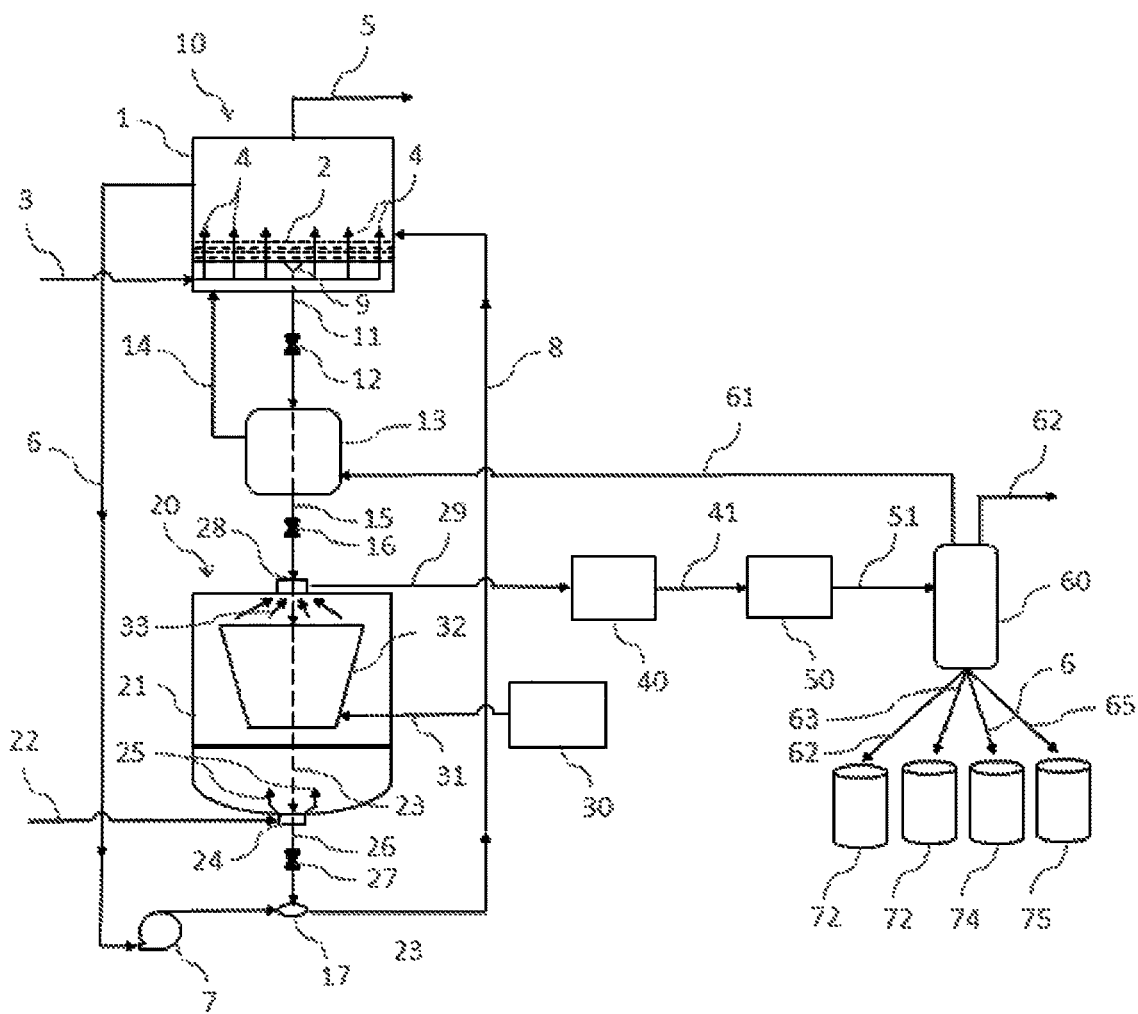
FIG. 1 is a schematic of a natural gas adsorption and regeneration system according to one embodiment of the present invention.

The invention includes a method and system for separating hydrocarbons, (e.g. NGLs from methane; $C_2+$ paraffins from methane or ethane or a combination methane and ethane). In one embodiment, the source gas to be treated is natural gas which includes a combination of paraffins (methane, ethane, propane and butane). Natural gas is most commonly obtained from oil wells, gas wells and condensate wells. A variety of the constituent gases may also be present. For example, raw natural gas often contain a significant amount of impurities, such as water or acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), and mercaptans. The term "natural gas liquids" (NGL) refers broadly to hydrocarbons having two or more carbons such as ethane, propane, butane and possibly small quantities of pentanes or heavier hydrocarbons. The term "$C_2+$ paraffins" refers to NGL paraffins other than ethane.

In one embodiment the subject method includes the step of passing a pressurized hydrocarbon gas mixture through a bed of adsorbent to at least partially remove NGLs from the hydrocarbon gas mixture to produce: (a) a NGL-loaded adsorbent and (b) NGL-depleted hydrocarbon gas mixture. The configuration of the bed is not particularly limited and both packed and fluidized beds may be used but packed moving beds are preferred. Applicable beds include a pressurizable vessel or chamber that includes one or more gas inlets and outlets along with an opening(s) for transferring adsorbent, e.g. transferring out NGL-loaded adsorbent and transferring in fresh or regenerated adsorbent. Preferred operating conditions include: pressures from 400 to 1200 psi; residence times of 0.5 to 1800 seconds, more preferably 5 to 480 seconds; and space velocities through the bed of from 0.5 feet/second to 0.001 feet/second. Applicable hydrocarbon gas mixtures include methane and NGLs, e.g. gas mixtures containing methane and one or more heavier alkanes including ethane, propane and butane.

Once the adsorbent becomes at least partially loaded with NGLs, the adsorbent may be removed from the bed and discarded. Alternatively, the NGL-loaded adsorbent may regenerated. Regeneration involves at least partially desorbing NGLs from the adsorbent. Desorbed NGLs may be recovered (stored, transported, etc.) or discarded. The process of regeneration may occur in the same bed where adsorption occurred, or the adsorbent may be transferred to a separate bed (vessel). Regeneration involves exposing the adsorbent to at least one of: a) higher temperature and b) lower pressure as compared with conditions present during the step of NGL adsorption. Applicable techniques for exposing the adsorbent to higher temperatures include heating the bed with electric or gas heaters, passing hot gas through the bed, and irradiating the adsorbent with microwave radiation (see for example U.S. Pat. No. 5,509,956, U.S. Pat. No. 5,946,816 and JP2005/194132). Irradiation with microwaves is a preferred approach. Techniques for reducing the pressure include venting the bed to an external tank or atmosphere. The step of regeneration may be conducted as a batch, semi-batch or continuous operation and may include combinations of TSA, PSA and VSA.

In a preferred embodiment, the subject method involves the steps of:

i) providing a bed of adsorbent selective for NGLs over methane;

ii) passing a hydrocarbon gas mixture containing methane and NGLs through the bed of adsorbent to at least partially remove NGLs from the gas mixture to produce: (a) NGL-loaded adsorbent and (b) NGL-depleted hydrocarbon gas mixture;

iii) recovering the NGL-depleted hydrocarbon gas mixture;

iv) regenerating the NGL-loaded adsorbent by at least partially removing NGLs from the adsorbent; and v) sequentially repeating steps (ii) and (iii) using regenerated adsorbent from step (iv).

In a preferred embodiment, step (i) occurs in an adsorption chamber, and step (iv) occurs in a desorption chamber, and NGL-loaded adsorbent is continuously transferred from the adsorption chamber to the desorption chamber, and regenerated adsorbent is continuously transferred from the desorption chamber to the adsorption chamber. Regeneration is preferably conducted by irradiating the adsorbent with microwaves. While different types of adsorbents may be used in combination, they preferably form a random or homogenous mixture forming a single packed moving bed. In a preferred embodiment, a single type of adsorbent is utilized.

The subject adsorbents exhibit an unexpected property of being highly regenerated by microwave, particularly those that are functionalized. As a consequence, methods and systems using microwave regeneration of the subject adsorbents are capable of achieving new levels of efficiency and in some instances, reduced need for microwave shielding.

A representative system for practicing the subject invention is illustrated in FIG. 1 including a NGL adsorption unit (10), an adsorption tank (1) including an adsorbent bed (2). Natural gas enters the adsorption unit (10) through line (3) at the lower portion of the adsorption tank (1) and passes (4) through the adsorbent bed (2). The adsorption bed (2) comprises an adsorbent which selectively adsorb $C_2$, $C_3$, $C_4$, $C_5$, and heavier hydrocarbons from the natural gas. Inlet temperature of the adsorption unit (10) can range from 5 to 100° C., preferably from 15 to 80° C., and more preferably from 20 to 70° C. Pressures of 14 to 1400 psia, preferably from 600 to 1200 psia, and more preferably from 800 to 1000 psia can be used. A methane rich natural gas product stream with a vastly reduced heavy hydrocarbon content than natural gas exits the adsorbent bed (2) from the top of the adsorption tank (1) through line (5). The methane rich natural gas stream may be recovered or flared.

As the adsorbent becomes loaded with NGLs, it passes through the bottom of the adsorption tank (1) through a transport mechanism (9) through line (11) into a microwave regeneration unit (20) having a regeneration tank (21) and a microwave heating system (32). The operating temperatures of the microwave heating system (32) can range from 105 to 350° C., preferably from 140 to 250° C., and more preferably from 145 to 200° C. Pressures of from 20 to 600 psia, preferably 100 to 400 psia, and more preferably 150 to 200 psia can be used. The microwave power source (30) heats the adsorbent (2) in the microwave heating system (32) causing the NGLs to vaporize (33). The microwave heating system (32) may include a heating apparatus and a heating or radiation system (not shown), and optionally a purge gas system (24). The heating apparatus can be coupled to and in communication with the radiation system for receipt of thermal energy generated by the radiation system, such as microwave radiation or electromagnetic energy, and with the purge gas system (24) for receipt of a purge gas to assist in the removal of volatiles from the adsorbent. NGLs are extracted from the regeneration tank (21) through a suction port (28) via a vacuum evacuation system (40). The regeneration tank (21) may optionally be fitted with a purge gas system (24) wherein purge gas, for example nitrogen, enters through line (22) and is dispersed (25) at the bottom of the regeneration tank (21). The regenerated adsorbent (23) is allowed to pass from the bottom of the regeneration tank (21) through line (26) then returned to the adsorption tank (1). A portion of the methane rich natural gas from the top of the tank (1) is circulated through line (6) by blower (7) to transport the regenerated adsorption (23) through line (8) to once again adsorb NGLs from natural gas (3).

The NGLs vacuum extracted from the regeneration tank (21) pass through the vacuum extraction system (40) through a gas compression system (50) and into a condenser (60) where the NGLs are condensed, optionally separated, and discharged either as a mixture of NGLs or individual fractions of ethane, propane, butane, pentane, and/or heavier hydrocarbons into one or more tank (72, 73, 74, and/or 75). The discharged NGLs may be recovered, transported, liquefied, re-injected, excluded, by-passed, or flared. Any methane making it to the condenser is recycled back to the adsorption tank (1) through line (61) and any other gas(es), purge gas, water, and/or contaminants can be separated through line (62).

In the illustrated embodiment, the NGL separation process is a continuous process with continuous adsorbent regeneration. For example, in the illustrated embodiment, there is a valve (12) in line (11) between the adsorber tank (1) and the regeneration tank (21) and a valve (27) in the line (26) between the regeneration tank (21) and collection tank (17). Valves (12) and (27) are synchronized to allow for holding loaded adsorption from the adsorption tank (1) while adsorption is being regenerated in the regenerator unit (20). When the adsorbent is regenerated in the regenerator tank (21), valve (27) allows the regenerated adsorbent (23) to exit the regenerator tank (21) and be transported back to the adsorption tank (1). Then valve (12) allows loaded adsorbent to enter the regenerator tank (21) to be regenerated. This process is repeated and allows for a continuous regeneration of the adsorption media.

In another embodiment of the present invention, the NGL separation process is a batch process with batch adsorbent regeneration. For example, in FIG. 1 there is a holding tank (13) between the adsorption tank (1) and the regeneration tank (21). When the adsorbent (2) is loaded, all of it is conveyed from the adsorption tank (1) through the transport mechanism (9) and line (11) to the holding tank (13). The contents of the holding tank (13) are then transported through line (15) to the regeneration tank (21) where the loaded adsorbent media is regenerated and returned to the adsorbent tank (1) where it is used until loaded and the process repeated.

The adsorbents used in the invention fall within a well-known class, i.e. polymeric macroporous alkylene-bridged adsorbent sometime also referred to as "macronets" or "hypercrosslinked" adsorbents. The subject adsorbents are distinguishable from carbonaceous adsorbents as the carbonaceous adsorbents are pyrolized (i.e. carbonized). The adsorbents used in the invention also exhibit much higher crush strengths, (e.g. above 500 g/bead, and preferably above 750 g/bead) as compared with carbonaceous adsorbents. The subject adsorbents are distinguishable from traditional macroporous ion exchange resins by possessing a ratio of alkylene bridging to phenol of 0.1 to 0.9:1, preferably 0.4 to 0.8:1 and more preferably 0.6 to 0.8:1 (see U.S. Pat. No. 5,079,274). The subject adsorbents are further distinguishable from macroporous exchange reins by possessing relatively high surface areas, e.g. 500 to 2100 $m^2/g$, preferably 750 to 2000 $m^2/g$, and more preferably from 1000 to 1500 $m^2/g$). The subject adsorbents are further distinguishable from traditional macroporous ion exchange resins by possessing much higher crush strengths, e.g. DOWEX MARATHON MSC has a crush strength from 375-475 g/bead while DOWEX™ OPTIPORE™ V493 has a crush in the 950-1150 g/bead range. DOWEX™ OPTIPORE™ V4.93 available from The Dow Chemical Company is an example of a suitable adsorbent for use in the invention. This adsorbent is polymeric, non-functionalized, macroporous, alkylene-bridged adsorbent comprising a styrene-divinylbenzene crosslinked copolymer matrix. Another suitable adsorbent from The Dow Chemical Company is DOWEX™ OPTIPORE™ V503, an adsorbent similar to OPTIPORE™ V493, however residual chloromethyl groups present in the matrix are reacted with diethyl benzene resulting in an adsorbent with increased hydrophobicity. (See U.S. Pat. No. 5,504,163). In a preferred embodiment, the subject adsorbents are functionalized and have dry weight capacities from 0.5 to 2.0 milliequivalents per gram (meq/g). A representative adsorbent available from The Dow Chemical Company includes DOWEX™ OPTIPORE™ SD-2, a polymeric, macroporous, alkylene-bridged adsorbent comprising a styrene-divinylbenzene crosslinked copolymer matrix functionalized with weak base groups (dimethyl amine). (See U.S. Pat. No. 4,950,332).

The subject adsorbents preferably adsorb (and readsorb after being degassed) greater than 60 $cm^3$ (STP) of propane per gram at 35° C. and 66.6 kPa (500 mm Hg) of propane. In another embodiment, the subject adsorbents preferably reach a temperature of at least 100° F. after 45 seconds of exposure to when exposed to a microwave operating at 2.45 GHz. (Adsorbents dried for at least 15 hours at 95° C. prior to testing). The adsorbents also preferably have a rate of temperature increase of at least 25° F. for the first 3 minutes of exposure to microwave operating at 2.45 GHz.

Methods for preparing and characterizing the subject adsorbents are well documented. See for example: U.S. Pat. No. 3,729,457, U.S. Pat. No. 4,263,407, U.S. Pat. No. 4,950,332, U.S. Pat. No. 4,965,083, U.S. Pat. No. 5,460,725, U.S. Pat. No. 5,616,622, U.S. Pat. No. 5,683,600 and U.S. Pat. No. 5,893,947 which are incorporated herein by reference. See also: V. A. Davankov, et al., Reaction Polymers, vol. 13, 27 (1990) and V. A. Davankov et al., "Structure and Adsorbent Properties of Hypercrosslinked Polystyrene Sorbents," Ion Exchange Developments and Applications, ed. J A. Greig (1996). Traditional uses of such adsorbents (including non-functionalized versions) include decolorization (U.S. Pat. No. 4,950,332), demineralization (U.S. Pat. No. 5,893,947), debittering (U.S. Pat. No. 4,965,083), acid removal (EP0481603), decaffeination (U.S. Pat. No. 5,021,253) and hydrocarbon removal (U.S. Pat. No. 5,079,274, U.S. Pat. No. 5,288,307, U.S. Pat. No. 5,509,956). The adsorbent may be functionalized (sulfonated, aminated, etc.) using standard techniques commonly used in connection with ion exchange resins. Representative techniques are described in U.S. Pat. No. 4,950,332 (amination), U.S. Pat. No. 5,616,622 (sulfonation) and U.S. Pat. No. 5,893,947. The subject adsorbent may be provided in a variety of forms, e.g. pellet, granular, etc., however, bead form is preferred with median diameters from 10 to 2000 microns, and more preferably from 300 to 1500 microns and even more preferably form 500 to 1000 microns. The beads may have a Gaussian particle size distribution or may have a relatively uniform particle size distribution, i.e. "monodisperse" that is, at least 90 volume percent of the beads have a particle diameter from about 0.8 to about 1.2, and more preferably 0.9 to 1.1 times the volume average particle diameter.

The subject adsorbents are macroporous. The term "macroporous" as commonly used in the art means that the polymer has both macropores and mesopores. Mesopores have diameters of from about 20 Å to about 200 Å and macropores have diameters greater than about 200 Å. While the subject adsorbent also includes micropores (diameters less than 20 Å), the presence of macropores distinguishes the subject adsorbent from gel-type or microporous ion exchange resins. The subject adsorbents have porosities from 0.1 to 0.7 cubic centimeters of pore volume per cubic centimeter of resin (cc/cc). Porosity, average pore size and surface area are determined by the nitrogen adsorption method in which dried and degassed samples are analyzed on an automatic volumetric sorption analyzer. The instrument works on the principle of measuring the volume of gaseous nitrogen adsorbed by a sample at a given nitrogen partial pressure. The volumes of gas adsorbed at various pressures are used in the B.E.T. model for the calculation of the surface area of the sample. The average pore radius is calculated from the relationship between the surface area and the pore volume of the sample.

The polymeric macroporous alkylene-bridged adsorbents of the present invention are based upon a porogen-modified crosslinked copolymer matrix of at least one monovinyl aromatic monomer and a polyvinyl aromatic crosslinking monomer. The crosslinked copolymer matrix is further crosslinked by subsequent alkylene bridging. Monovinyl aromatic monomers include styrene, vinyltoluenes, ethylvinylbenzenes and vinylnaphthalenes and may also include heterocyclic monomers such as vinylpyridine. The preferred monovinyl aromatic monomers include styrene, vinyltoluene, ethylvinylbenzene and mixtures thereof. Styrene, ethylvinylbenzene and their mixtures are most preferred. The monovinyl aromatic monomers comprise of from 45 to 80 weight percent of the total monomer mixture, preferably of from 65 to 80 weight percent of the total monomer mixture.

Monovinyl aliphatic monomers include derivatives of acrylic and methacrylic acids and acrylonitrile. The preferred monovinyl aliphatic monomers include methyl methacrylate, acrylonitrile, ethyl acrylate, 2-hyroxyethyl methacrylate and mixtures thereof. The monovinyl aliphatic monomers comprise of from 0 to 20 weight percent of the total monomer mixture. Since subsequent alkylene bridging occurs between aromatic rings, it is often preferable not to employ any monovinyl aliphatic monomer or to keeps its amount to a minimum.

Polyvinyl aromatic crosslinking monomers include divinylbenzene and trivinylbenzene with divinylbenzene being most preferred. Commercial divinylbenzene typically consists of from 55 to 80 weight percent divinylbenzene in admixture with from 20 to 45 weight percent ethylvinylbenzene. The actual polyvinyl aromatic crosslinking monomer comprises of from 20 to 35 weight percent of the total monomer mixture. In any given instance, the ratio of the monovinyl aromatic and aliphatic monomer to the polyvinyl aromatic crosslinking monomer is from 1.8-4.0.

The crosslinked copolymer matrix which form the basis of the present invention are porogen-modified, i.e., they are prepared by suspension polymerization in the presence of a porogenic solvent or a mixture of two or more such porogenic solvents. Porogenic solvents are those solvents which are suitable for forming pores and/or displacing the polymer chains during polymerization. The characteristics and use of such solvents in the formation of macroporous adsorbents are described in U.S. Pat. No. 4,224,415. A porogenic solvent is one which dissolves the monomer mixture being copolymerized but which does not dissolve the copolymer. In addition, the porogenic solvents must be inert to the polymerization conditions, i.e., neither interfere with or enter into the polymerization. For the crosslinked copolymers prepared from the monovinyl aromatic monomers and the polyvinyl aromatic crosslinking monomers of the present invention, aromatic hydrocarbons like toluene, xylene and ethylbenzene, $C_6$-$C_{12}$ saturated aliphatic hydrocarbons like heptane and iso-octane and $C_4$-$C_{10}$ alkanols like tert-amyl alcohol, sec-butanol and 2-ethylhexanol are particularly effective. Aromatic hydrocarbons and $C_6$-$C_{12}$ saturated aliphatic hydrocarbons and their mixtures are preferred; toluene alone or in mixtures with a $C_6$-$C_8$ saturated aliphatic hydrocarbon is most preferred. A sufficient concentration of porogenic solvent is required to effect phase separation or polymer chain displacement. Typically, the porogenic solvent comprises of from 50 to 70 weight percent and preferably from 55 to 65 weight percent of the total weight of the monomer mixture and the porogenic solvent.

The term suspension polymerization is a term well known to those skilled in the art and comprises suspending droplets of the monomer or monomer mixture and of the porogenic solvent in a medium in which neither are soluble. This may be accomplished by adding the monomer or monomer mixture and the porogenic solvent with any additives to the suspending medium which contains a dispersing or suspending agent. For the ethylenically unsaturated aromatic monomers of the present invention, the suspending medium is usually water and the suspending agent a suspension stabilizer, e.g., gelatin, polyvinyl alcohol or a cellulosic such as hydroxyethyl cellulose, methyl cellulose or carboxymethyl methyl cellulose. When the medium is agitated, the organic phase (monomer and porogenic solvent) disperses into fine droplets. Polymerization is accomplished by heating in the presence of a free-radical initiator. The free-radical initiator may be any one or a combination of conventional initiators for generating free radicals in the polymerization of ethylenically unsaturated monomers. Representative initiators are UV radiation and chemical initiators, such as azo-compounds like azobisisobutyronitrile; and peroxygen compounds such as benzoyl peroxide, t-butylperoctoate, t-butylperbenzoate and iso-propylpercarbonate. Only a catalytic amount of initiator is required. The usual range is from about 0.01 to about 3 percent of initiator with reference to the weight of the monomer mixture. The preferred range is from 0.1 to 1.5 percent. The optimum amount of initiator is determined in large part by the nature of the particular monomers selected, the nature of the impurities present and the volume of porogen used. For example, when higher levels of polyvinyl aromatic crosslinking monomer is employed, it may be necessary to use a greater percentage of free-radical initiator, e.g. greater than 0.5 weight percent.

In a typical suspension polymerization, the organic phase containing monomer, porogenic solvent and initiator is suspended within an agitated aqueous medium. Generally, the suspending medium is employed in an amount of from 30 to 70 weight percent, preferably from 35 to 50 weight percent based on the total weight of organic phase and suspending medium. The polymerization is conducted at a temperature from between 30° and 130° C., preferably from between 70° and 110° C.

Alternatively, the copolymer beads can be prepared by a seeded, continuous-addition process as described, for example, in U.S. Pat. No. 4,419,245, U.S. Pat. No. 4,564, 644 and U.S. Pat. No. 5,231,115 which are incorporated herein by reference. In such a process, seed particles of crosslinked copolymer are suspended in an aqueous phase and swelled with an organic phase as described above, i.e., monomer mixture, porogenic solvent and initiator. After 40 to 95 percent polymerization, a second organic phase is continuously added while polymerization continues. The second organic phase can be the same as the first or different provided that the ratios of monovinyl aromatic monomer, polyvinyl aromatic crosslinking monomer and porogenic solvent are within the limitations of the present invention. Preferably, the second organic phase is devoid of initiator.

The adsorbents of the present invention can be prepared from the aforementioned crosslinked copolymer beads by additional alkylene-bridging (post-crosslinking) of individual polymer chains after polymerization. Post-crosslinking may be achieved by first swelling the copolymer beads under non-reactive conditions with a swelling agent along with the haloalkylating agent and an effective amount of a Friedel-Crafts catalyst. The haloalkylating agent advantageously has the Friedel-Crafts catalyst incorporated therein. The swollen copolymer beads are then maintained at a temperature sufficient to react the haloalkylating agent with the copolymer beads until achieving a desired degree of reaction, usually from 0.6 to 0.7 haloalkyl groups per aromatic ring. The reaction temperature can be from 20° C. to 180° C. More preferably, the temperature is from 60° C. to 85° C. Methods for haloalkylating copolymer beads are described in: U.S. Pat. No. 2,642,417, U.S. Pat. No. 2,960,480, U.S. Pat. No. 2,992,544, U.S. Pat. No. 4,191,813, U.S. Pat. No. 4,263,407 and U.S. Pat. No. 4,950,332 which are incorporated herein by reference.

Friedel-Crafts catalysts are Lewis acids and include for example, $AlCl_3$, $FeCl_3$, $BF_3$ and HF. $AlCl_3$ and $FeCl_3$ are preferred. Preferred haloalkylating agents include chloromethyl methyl ether and α,α'-dichloroxylene, with chloromethyl methyl ether being most preferred. Suitable swelling agents are solvents which are substantially inert during post-crosslinking of the haloalkylated copolymer and include chlorinated hydrocarbons, such as dichloroethane, chlorobenzene, dichlorobenzene, methylene chloride, and propylene dichloride, or nitrogen-substituted aromatics, like nitrobenzene.

When the copolymer matrix is chloromethylated, reaction of a chloromethyl group with the aromatic ring of an adjacent copolymer chain results in formation of an alkylene bridge or in this example, a methylene bridge, i.e., a ($—CH_2—$) moiety, between two copolymer chains as illustrated in the following reaction pathway.

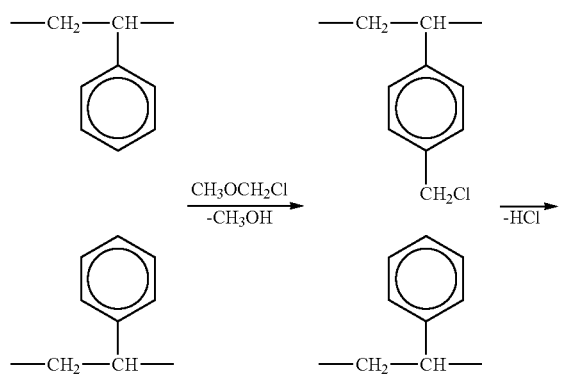

-continued

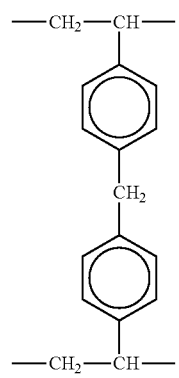

After formation of the bridging moiety, the haloalkylating agent and swelling agent may be removed by conventional methods, such as solvent extraction, washing, drying, or a combination thereof. If a drying step is used, it is preferred to avoid an oxygen-containing atmosphere at temperatures above normal room temperature.

The alkylene-bridged matrix may then be functionalized (sulfonated, aminated, etc.) using classic methods described in the literature. See for example: U.S. Pat. No. 2,500,149, U.S. Pat. No. 2,631,127, U.S. Pat. No. 2,664,801, U.S. Pat. No. 2,764,564, U.S. Pat. No. 3,037,052, U.S. Pat. No. 3,266,007, U.S. Pat. No. 4,950,332, U.S. Pat. No. 5,248,435, U.S. Pat. No. 5,616,622, US2002/002267 and US2004/0006145; relevant teachings of which are incorporated herein by reference. In general, sulfonated adsorbents are prepared by reacting the alkylene-bridged copolymer matrix with a sulfonation agent, such as concentrated sulfuric acid (acid which has at least about 95 weight percent sulfuric acid based upon total weight), oleum, chlorosulfonic acid, or sulfur trioxide, at a temperature and for a time sufficient to achieve a desired degree of sulfonation. A preferred sulfonation agent is concentrated sulfuric acid. The amount of concentrated sulfuric acid should be sufficient to provide adequate mixing during reaction, with a weight ratio of acid to beads of from about 2:1 to about 20:1 being generally sufficient. Typically, the acid and copolymer beads are maintained at a temperature from about 0° C. to about 200° C. for a time sufficient to obtain adsorbent having a dry weight capacity of at least about 0.5 milliequivalents per gram (meq/g). Sulfonation may be conducted in the presence of a swelling agent. Representative swelling agents include: methylene chloride, ethylene dichloride, dichloropropane, sulfur dioxide, benzene, toluene, xylene, ethylbenzene, isopropylbenzene, chlorobenzene, nitrobenzene, nitromethane, tetrachloroethane and tetrachloroethylene. Examples of applicable aminations reactions described in: U.S. Pat. No. 5,134,169, U.S. Pat. No. 5,141,965, U.S. Pat. No. 6,756,462, U.S. Pat. No. 6,924,317, U.S. Pat. No. 7,282,153, US2004/0256597 and U.S. Pat. No. 4,950,332. Preferred amine functional groups include dimethyl amine, trimethyl amine and diethylenetriamine (DETA) also known as N-(2-aminoethyl-1,2-ethanediamine).

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

Example 1

NGLs adsorption capacity and breakthrough properties for two commercially available macroporous alkylene-bridged adsorbent where tested as described below.

Sample 1 (DOWEX™ OPTIPORE™ V493) (non-functionalized)

Sample 2 (DOWEX™ OPTIPORE™ V503) post reaction of residual chloromethyl groups by reaction with diethyl benzene resulting in a media that has increased hydrophobicity.

Methane, Ethane, Propane and Butane: A Micromeritics ASAP 2020 Surface Area and Porosity Analyzer is used to analyze methane (Sigma-Aldrich, 99.0%), ethane (Sigma-Aldrich, 99.99), propane (Sigma-Aldrich, 99.97%), and butane (Matheson Tri-Gas, 99.9%) adsorption at 308 K. Prior to analysis, the macroporous polymeric adsorbent being tested (0.3 to 0.5 grams) is degassed in a quartz U-tube at 423 K under vacuum to a pressure below 5 μmHg for 12 hours. Pressure points are taken between 5 to 600 mmHg with a 45 seconds equilibration interval. The samples are then evacuated under vacuum for 1 hour before repeating the pressure points.

Pentane: A Micromeritics ASAP 2020 Surface Area and Porosity Analyzer equipped with vapor introduction option with dual-zone temperature control is used to analyze static pentane adsorption at 273 K. An ethylene glycol/water mixture contained within a chiller dewer is used as temperature control for the sample. Pentane (Sigma-Aldrich, anhydrous, ≥99%) is placed in a quartz vessel located in the temperature-regulated vapor furnace which is controlled to 308K. Prior to pentane analysis, the macroporous polymeric adsorbent being tested is degassed in a quartz tube at 373 K under vacuum to a pressure below 5 mmHg for at least 12 hours. Relative pressure points are taken between 0.005<P/$P_0$<0.50. The saturation pressure, $P_0$, was calculated to be 183.526 mmHg based on pentane adsorptive properties and the analysis bath temperature.

Figure 2:
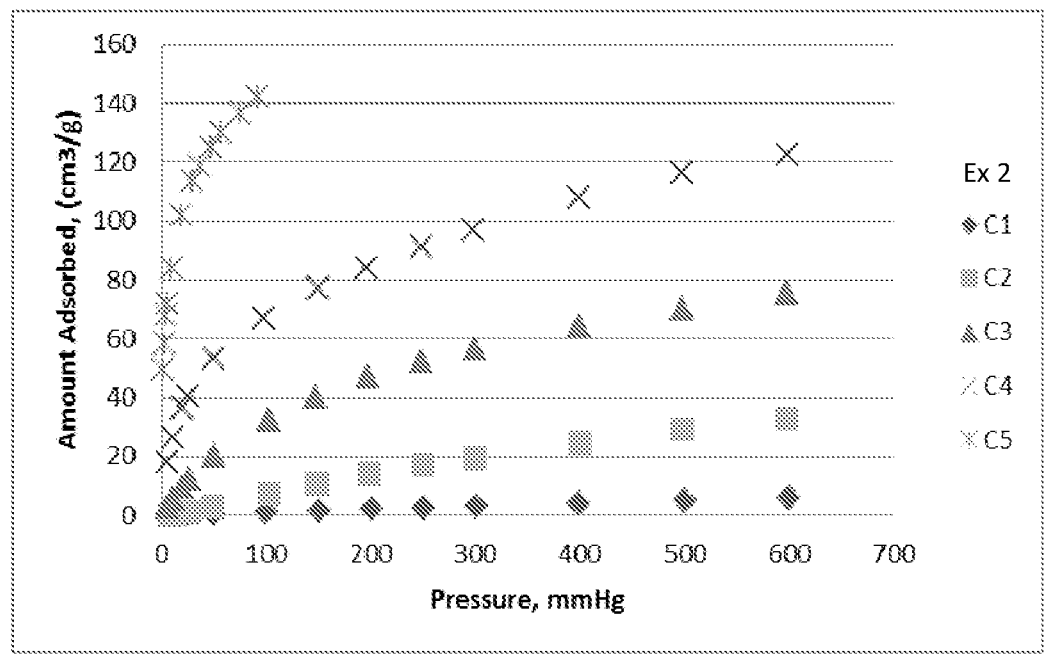
FIG. 2 includes sorption isotherms for methane, ethane, propane, butane, and pentane using DOWEX™ OPTI-PORE™ V493 according to testing protocol of Example 1.
Figure 3:
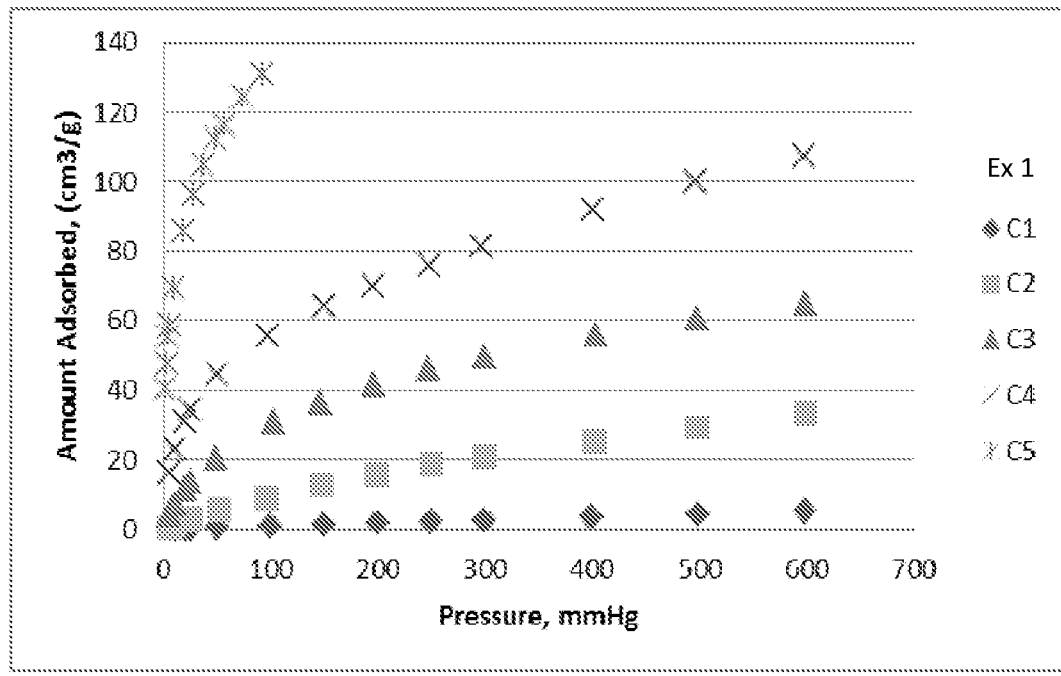
FIG. 3 includes sorption isotherms for methane, ethane, propane, butane, and pentane using DOWEX™ OPTI-PORE™ V503 according to testing protocol of Example 1.

Adsorption Breakthrough:

Breakthrough curve data for the adsorbent was determined using a GC/mass spectrometer (mass spec). The GC/mass spec is calibrated, then a 40 g sample is loaded into the sample column. A mixed gas comprising a ratio of $CH_4/C_2H_6/C_3H_8/C_4H_{10}$ at 40/40/40/40 standard cubic centimeters per minute (SCCM) is analyzed. Gas flow is initiated. This flow by-passes the packed bed (i.e., column). The system is allowed to equilibrate for 2 hours. The gas from the by-pass is then analyzed by the mass spec. Following a two minute delay, the three-way valve is opened to allow the mixed gas to enter the packed bed column. The data for the mass spec analysis of the mixed gas leaving the packed bed column is recorded. The system is allowed to run until all gases have been analyzed in the mass spec and recorded. Table 1 lists the breakthrough times for each gas. Isotherms for Samples 1 and 2 are provided in FIGS. 2 and 3, respectively.

TABLE 1

| Polymeric Sorbent Media | Sample 1 | Sample 2 |
|---|---|---|
| Weight, g | 40 | 40 |
| Volume, cc | 109 | 130 |
| Bulk Density, g/cc | 0.37 | 0.31 |
| Methane breakthrough, min | 5.2 | 6 |
| Ethane breakthrough, min | 13.2 | 16.5 |
| Propane breakthrough, min | 27.3 | 33.2 |
| Butane breakthrough, min | 64 | 81.4 |

Example 2

Figure 4:
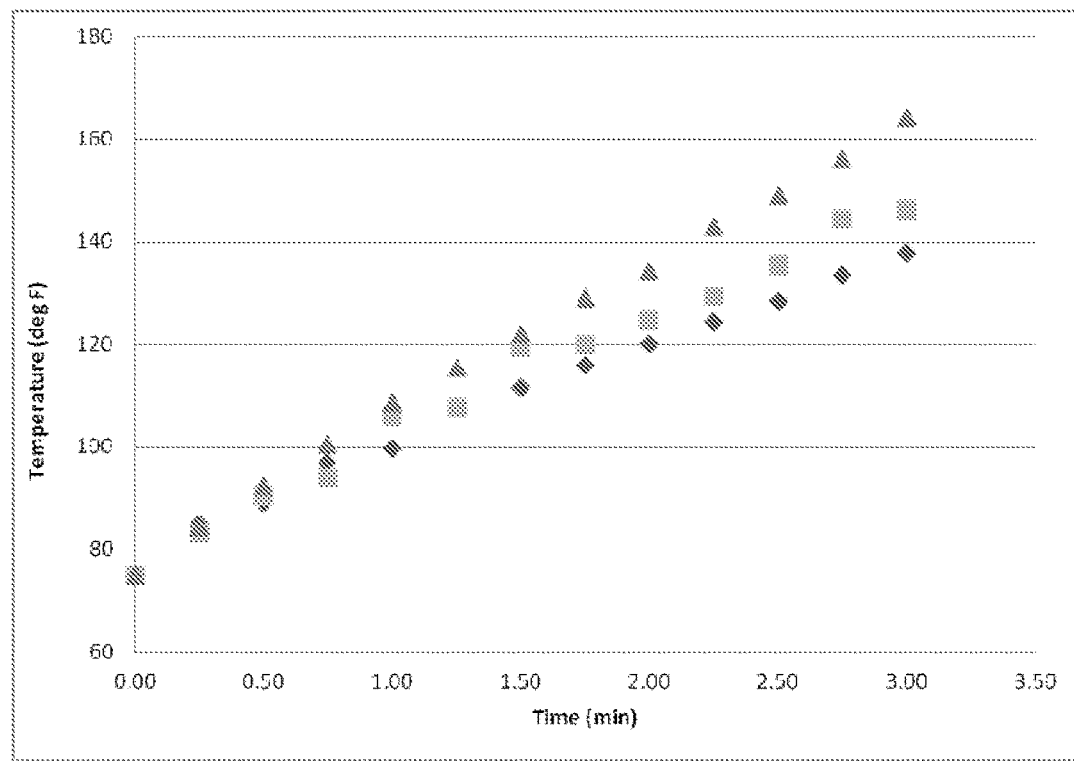
FIG. 4 is a plot of temperature (° F.) as a function of time (minutes) and corresponds to Example 2.
Figure 5:
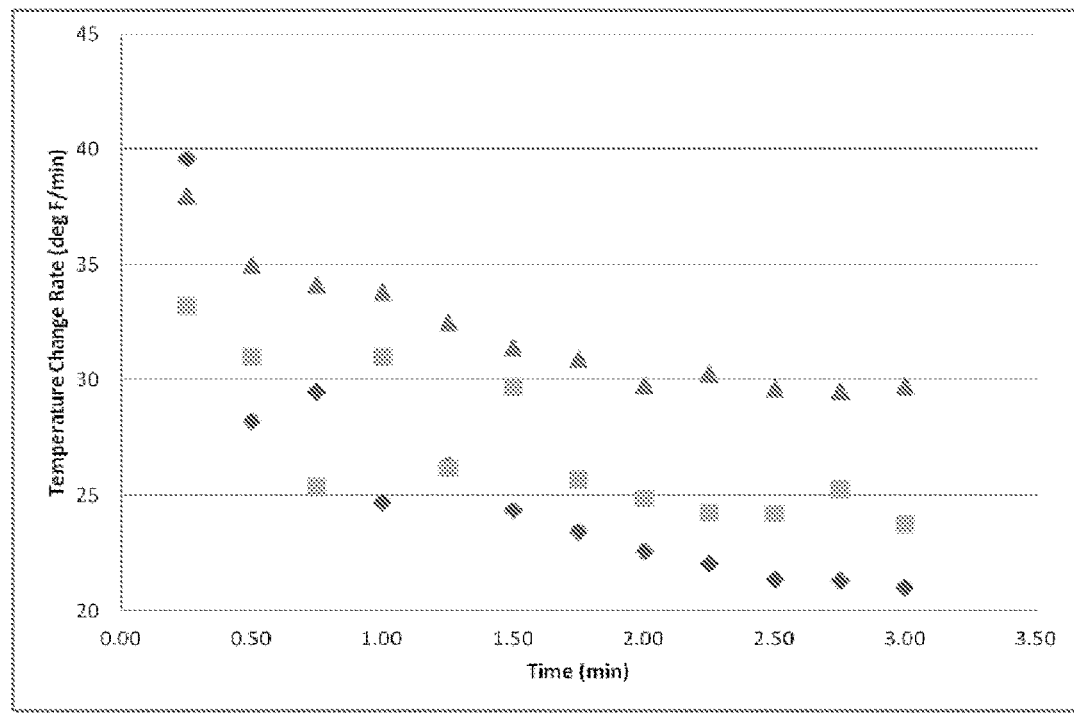
FIG. 5 is a plot of temperature change rate (° F./min) as a function of time (minutes) and corresponds to Example 2.

In order to demonstrate the unique microwave adorption properties of functionalized embodiments of the subject macroporous alkylene-bridged adsorbents, three commercially available adsorbents (noted below) where exposed to microwave under identical conditions. The temperature of the adsorbents were monitored as a function of time, with the temperature serving as a surrogate for microwave adsorption. Results are summarized in FIGS. 4 and 5.

Sample adsorbents:
◇ DOWEX™ OPTIPORE™ V503 (non-functionalized
■ DOWEX™ OPTIPORE™ V493 (non-functionalized)
▲ DOWEX™ OPTIPORE™ SD-2 (functionalized)

Example 3

In order to demonstrate the superior propane adsorption characteristics of the subject adsorbents, five different adsorbents where compared with commercially available macroporous ion exchange resins. All samples were based upon a macroporous crosslinked copolymer matrix derived from a monomer mixtures comprising styrene and divinylbenzene.

A Micromeritics ASAP 2020 Surface Area and Porosity Analyzer was used to analyze propane (Sigma-Aldrich, 99.97%) adsorption at 308 K. Prior to analysis, the macroporous polymeric adsorbent being tested (0.3 to 0.5 grams) was degassed in a quartz U-tube at 423 K under vacuum to a pressure below 5 μmHg for 12 hours. Pressure points are taken at 400, 500 and 600 mmHg with a 45 seconds equilibration interval.

As illustrated by the results summarized in Table 2, the subject alkylene-bridged adsorbents had good propane adsorption whereas the corresponding macroporous resins without alkylene-bridging had little to no propane adsorption.

TABLE 2

| Pressure (mmHg) | 3-1 | 3-2 | 3-3 | 3-4 | 3-5 | 3-6 | 3-7 | 3-8 | 3-9 |
|---|---|---|---|---|---|---|---|---|---|
| 400 | 64.283 | 64.7 | 60.2 | 56.7 | 45.6 | −1 | 4.1 | 0.8 | −0.32 |
| 500 | 70.411 | 70.4 | 65.2 | 60.5 | 48.3 | −1 | 4.8 | 1.3 | −0.32 |
| 600 | 75.786 | 75.7 | 69.5 | 65.5 | 50.4 | −1 | 5.4 | 1.6 | −0.32 |

Sample 3-1: Dowex ™ Optipore ™ V493
Sample 3-2: Dowex ™ Optipore ™ SD-2
Sample 3-3: Macroporous alkylene-bridged adsorbent similar to 3-2 but functionalized with trimethyl amine
Sample 3-4: Macroporous alkylene-bridged adsorbent similar to 3-2 but functionalized with diethylene triamine
Sample 3-5: Macroporous alkylene-bridged adsorbent similar to 3-2 but functionalized with sulfuric acid
*Sample 3-6: Dowex ™ 22 (macroporous, type 2 strong base anion exchange resin)
*Sample 3-7: Dowex ™ 66 (macroporous weak base anion exchange resin)
*Sample 3-8: Dowex ™ Marathon MSC (macroporous cation exchange resin)
*Sample 3-9: Dowex ™ Marathon MSA (macroporous anion exchange resin)
*Comparison only (not part of the subject invention).

The invention claimed is:
1. A method for separating methane or ethane from a hydrocarbon gas mixture comprising methane or ethane, or a combination of methane and ethane, along with $C_3$ and heavier paraffins, wherein the method comprises the steps of:
  i) providing a bed of a macroporous alkylene-bridged adsorbent selective for $C_3$ and heavier paraffins over methane and ethane;
  ii) passing a hydrocarbon gas mixture through the bed of adsorbent to at least partially remove $C_3$ and heavier paraffins from the gas mixture to produce: (a) $C_3$ and heavier paraffins-loaded adsorbent and (b) $C_3$ and heavier paraffins-depleted hydrocarbon gas mixture;
  iii) recovering the $C_3$ and heavier paraffins-depleted hydrocarbon gas mixture;
  iv) regenerating the $C_3$ and heavier-loaded adsorbent by at least partially removing $C_3$ and heavier paraffins from the adsorbent; and
  v) sequentially repeating steps (ii) and (iii) using regenerated adsorbent from step (iv).

2. A method for separating methane from a hydrocarbon gas mixture comprising methane and natural gas liquids (NGLs) that comprise ethane and heavier paraffins, wherein the method comprises the steps of:
  i) providing a bed of a macroporous alkylene-bridged adsorbent selective for NGLs over methane;
  ii) passing a hydrocarbon gas mixture through the bed of adsorbent to at least partially remove NGLs from the gas mixture to produce: (a) NGLs-loaded adsorbent and (b) NGLs-depleted hydrocarbon gas mixture;
  iii) recovering the NGLs-depleted hydrocarbon gas mixture;
  iv) regenerating the NGLs-loaded adsorbent by at least partially removing NGLs from the adsorbent; and
  v) sequentially repeating steps (ii) and (iii) using regenerated adsorbent from step (iv).

3. The method of claim 2 wherein step (i) occurs in an adsorption chamber, and step (iv) occurs in a desorption chamber, and wherein NGL-loaded adsorbent is continuously transferred from the adsorption chamber to the desorption chamber, and regenerated adsorbent is continuously transferred from the desorption chamber to the adsorption chamber.

4. The method of claim 3 wherein the adsorbent located in the adsorption chamber forms a packed moving bed.

5. The method of claim 2 wherein the step of regenerating the NGL-loaded adsorbent comprises irradiating the adsorbent with microwaves.

6. The method of claim 1 wherein the adsorbent comprises a functionalized macroporous alkylene-bridged adsorbent.

7. The method of claim 6 wherein the macroporous alkylene-bridged adsorbent comprises an amine or a sulfur containing functional group.

8. The method of claim 2 wherein the step of regeneration comprises exposing the adsorbent to lower pressure.

9. The method of claim 2 wherein the adsorbent comprises a functionalized macroporous alkylene-bridged adsorbent.

* * * * *